(12) United States Patent
Burger

(10) Patent No.: US 12,142,864 B2
(45) Date of Patent: Nov. 12, 2024

(54) ELECTRIC CONTACT ELEMENT FOR HIGH OPERATING VOLTAGES

(71) Applicant: ERNI INTERNATIONAL AG, Brüttisellen (CH)

(72) Inventor: Michael Burger, Pforzheim (DE)

(73) Assignee: ERNI INTERNATIONAL AG, Brüttisellen (CH)

( * ) Notice: Subject to any disclaimer, the term of this patent is extended or adjusted under 35 U.S.C. 154(b) by 0 days.

(21) Appl. No.: 17/607,785

(22) PCT Filed: May 5, 2020

(86) PCT No.: PCT/EP2020/062403
§ 371 (c)(1),
(2) Date: Oct. 29, 2021

(87) PCT Pub. No.: WO2020/244866
PCT Pub. Date: Dec. 10, 2020

(65) Prior Publication Data
US 2022/0224035 A1  Jul. 14, 2022

(30) Foreign Application Priority Data

Jun. 5, 2019 (DE) ...................... 10 2019 115 243.7

(51) Int. Cl.
*H01R 13/03* (2006.01)
*C22C 5/02* (2006.01)
*C22C 9/00* (2006.01)
*C22C 19/03* (2006.01)

(52) U.S. Cl.
CPC ............... *H01R 13/03* (2013.01); *C22C 5/02* (2013.01); *C22C 9/00* (2013.01); *C22C 19/03* (2013.01)

(58) Field of Classification Search
None
See application file for complete search history.

(56) References Cited

U.S. PATENT DOCUMENTS

| 4,268,568 | A | 5/1981 | Sard et al. |
| 4,503,131 | A | 3/1985 | Baudrand |
| 6,613,451 | B1 | 9/2003 | Asahara et al. |
| 2005/0196634 | A1 | 9/2005 | Abe et al. |
| 2006/0210824 | A1* | 9/2006 | Harrington ............ C23C 26/00 428/626 |

(Continued)

FOREIGN PATENT DOCUMENTS

| EP | 586300 A1 | 3/1994 |
| EP | 3375910 A2 | 9/2018 |
| JP | 2007084923 A * | 4/2007 |

OTHER PUBLICATIONS

Ju Feng Special Steel, "JIS-C1201P/1201R", <https://www.jfs-steel.com/en/steelDetail/JIS-C1201PC1201R-H3100.html>, accessed Mar. 7, 2023.*

(Continued)

*Primary Examiner* — Xiaobei Wang
(74) *Attorney, Agent, or Firm* — Weber Rosselli & Cannon LLP

(57) ABSTRACT

An electrical contact element for a connector has a metallic base body and a wear layer applied to the base body. The wear layer consists of an alloy having the components 82-91% by weight nickel, 9-18% by weight phosphorous, and 0-1% by weight further alloy elements.

9 Claims, 2 Drawing Sheets

(56) References Cited

U.S. PATENT DOCUMENTS

| | | | | |
|---|---|---|---|---|
| 2010/0101831 A1* | 4/2010 | Kobayashi | ............. | H01R 13/03 |
| | | | | 205/261 |
| 2014/0102759 A1* | 4/2014 | Schmidt | ................ | H01R 13/03 |
| | | | | 29/874 |
| 2016/0064846 A1* | 3/2016 | Tadokoro | ............... | C25D 5/619 |
| | | | | 439/886 |

OTHER PUBLICATIONS

Chemical Book, "Perfluoropolyether", <https://www.chemicalbook.com/ChemicalProductProperty_EN_CB5271384.htm>, accessed Aug. 8, 2023.*

Chemical Book, "Polytetrafluoroethylene", <https://www.chemicalbook.com/ChemicalProductProperty_EN_CB4392561.htm>, accessed Feb. 21, 2024.*

German Office Action issued in German Patent Application No. 102019115243.7 dated Feb. 21, 2020, No English translation available.

International Search Report issued in PCT/EP2020/062403 dated Aug. 18, 2020, with English translation.

* cited by examiner

ELECTRIC CONTACT ELEMENT FOR HIGH OPERATING VOLTAGES

The present invention relates to an electrical contact element for a connector suitable for electrical operating voltages of more than 150 V.

PRIOR ART

Electrical connectors generally have one or more electrical contact elements and one or more insulating bodies. The contact elements are usually designed as male elements or female elements. These are made of base materials which are not resistant to corrosion. These are often copper alloys. To ensure the function of the contact elements over the service life of the connector, thin layers of other metals are therefore applied to the base material. These can comprise an intermediate layer and a wear layer.

The intermediate layer can have various purposes. It can improve the adhesion of the wear layer to the base material, create a mechanical balance between the base material and the wear layer, and prevent diffusion processes from taking place between the wear layer and the base material. The intermediate layer often consists of copper or nickel.

The wear layer, which is also referred to as the functional layer, is located on the intermediate layer. The wear layer extends the technically useful life of the contact element, can improve electrical transmission, and protect the underlying layers from corrosion. It can consist of soft, non-inert metals such as tin or silver. In connectors in the automotive sector, for example, silver is widely used as a wear layer. If voltages of more than 150 V occur in an application, the force of the electrical potential between different contact elements can increasingly excite metal ions to move from one physical position to another. This metal migration can cause short circuits and other technical problems in the connector. Silver functional surfaces are prone to this type of metal migration at higher voltages. For this reason, more expensive precious metal functional layers are usually used in applications with operating voltages of more than 150 V. By way of example, gold-cobalt alloys or palladium-nickel alloys are thus used.

It is an object of the present invention to provide an electrical contact element suitable for use in an electrical connector and suitable for electrical operating voltages of more than 150 V. However, it should be possible to manufacture it at a lower cost than conventional electrical contact elements and still achieve the reliability and service life of conventional electrical contact elements.

DISCLOSURE OF THE INVENTION

This object is solved by an electrical contact element for a connector, which has a metallic base body or a wear layer applied to the base body. The wear layer can be applied directly to the metallic base body or one or more further layers can be arranged between the metallic base body and the wear layer. The wear layer consists of the following alloy elements: 82-91% by weight nickel, 9-18% by weight phosphorous and 0 to 1% by weight further alloy elements. Preferably, the layer consists of 82-89% by weight nickel, 11-18% by weight phosphorous and 0 to 1% by weight further alloy elements. The sum of the alloy elements is 100% by weight. A proportion of up to 1% by weight of further alloy elements in the alloy, for example as impurities, is acceptable but is preferably avoided. In accordance with the invention, it has been found that the use of such a wear layer provides similarly good electrical transmission and similarly good corrosion protection as can be achieved, for example, with the wear layer made of a gold-cobalt alloy or a palladium-nickel alloy. However, the use of the nickel-phosphorous alloy makes it possible to manufacture the electrical contact element more cost-effectively in comparison.

In a preferred embodiment of the invention, the wear layer is arranged directly on the base body, such that there are no further layers between the wear layer and the base body. To ensure good corrosion protection, it is preferred in this embodiment that the wear layer has a thickness in the range of from 1.00 μm to 2.50 μm. Particularly preferably, the thickness is in the range of from 1.50 μm to 2.00 μm. The wear layer used according to the invention offers such good protection against corrosion and such good electrical transmission that these properties could not be significantly improved by further increasing the layer thickness. On the other hand, when using a conventional wear layer of a gold-cobalt alloy or a palladium-nickel alloy, for example, a layer thickness of at least 3 μm with simultaneous use of a metallic intermediate layer is usually required for the electrical contact element to meet the requirements for corrosion resistance and electrical transmission at all. The invention therefore not only makes it possible to manufacture the electrical contact element using less expensive materials, but also to save on the amount of material by using a particularly thin wear layer.

In another preferred embodiment of the invention, a metallic intermediate layer is arranged between the base body and the wear layer. Particularly preferably, the intermediate layer is the only layer arranged between the wear layer and the base body, such that the base body is directly connected to the intermediate layer and the intermediate layer is directly connected to the wear layer. As in the conventional design of the electrical contact element, the intermediate layer improves the adhesion of the wear layer to the base body, ensures mechanical compensation between the base body and the wear layer and prevents diffusion processes between the wear layer and the base body. In addition, the intermediate layer enables the use of a thinner wear layer compared to the embodiment of the invention in which the wear layer is arranged directly on the base body. In this embodiment, the wear layer preferably has a thickness in the range of from 0.15 μm to 1.50 μm. Particularly preferably, the thickness is in the range of from 0.30 μm to 1.00 μm.

In one embodiment of the contact element, the intermediate layer contains 99 to 100% by weight copper and 0 to 1% by weight further alloy elements. In another preferred embodiment of the contact element, the intermediate layer contains 99 to 100% by weight nickel and 0 to 1% by weight further alloy elements. The sum of the alloy elements is thus 100% by weight. The proportion of the further alloy elements should preferably be as low as possible, but their presence cannot be completely ruled out due to impurities.

The thickness of the intermediate layer is preferably 1.5 μm to 4.0 μm, and particularly preferably 2.0 μm to 3.0 μm.

Furthermore, it is preferred that a metallic and/or organic sliding layer is arranged on the wear layer. The sliding layer can improve the sliding properties of electrical contact elements, in particular of female elements and male elements. In this way, it helps the wear layer to remain functional for longer under mechanical frictional stress. On the other hand, it can also optimise electrical transmission between the electrical contact elements. If the sliding layer contains both metallic and organic components, it is preferred that a metallic partial layer is applied directly to the wear layer and an organic partial layer is applied to this metallic partial layer. The metallic partial layer and the organic partial layer then together form the sliding layer.

A particularly suitable metallic material for the sliding layer is pure gold or a gold alloy consisting of the following alloy elements: 98.5 to 100.0% by weight gold, 0 to 0.5% cobalt and 0 to 1.0% by weight further alloy elements. The sum of the alloy elements is 100% by weight.

Particularly suitable organic materials of the sliding layer are at least one fluoropolymer and/or at least one fatty acid salt. The fluoropolymer can, for example, be a perfluoropolyether (PFPE) or polytetrafluoroethylene (PTFE). The fatty acid salt can be, for example, lithium-12-hydroxystearate.

The thickness of the sliding layer is preferably in the range of from 0.05 μm to 0.25 μm. Such sliding layers are already sufficient to give the electrical contact element good sliding properties, such that the application of the sliding layer to the wear layer does not result in any significant increase in the thickness of the entire coating.

The wear layer of the electrical contact element according to the invention can be used particularly advantageously if the base body is made of copper, a low-alloyed copper alloy or a brass. In this case, it consists of the following alloy elements: 50 to 100% by weight copper, 0 to 45% by weight zinc and 0 to 5% by weight further alloy elements. The sum of the alloy elements in this case is 100% by weight. Even if the sum of the further alloy elements herein can be up to 5% by weight, it is preferred that each individual further alloy element constitutes no more than 2% by weight of the total alloy. Furthermore, it is preferred that only the other alloy elements beryllium, chromium, iron, cobalt, magnesium, manganese, nickel, phosphorous, sulphur, silver, silicon, tellurium, titanium, tin, and zirconium can each be present in the alloy in an amount of up to 2% by weight, and that all other alloy elements not mentioned in this list are present in an amount of not more than 1% by weight in each case.

The electrical contact element according to the invention can be manufactured with good technical properties without having to use large quantities of expensive precious metals.

BRIEF DESCRIPTION OF THE DRAWINGS

Exemplary embodiments of the invention are depicted in the drawings and are explained in more detail in the following description.

EXEMPLARY EMBODIMENTS OF THE INVENTION

Figure 1:
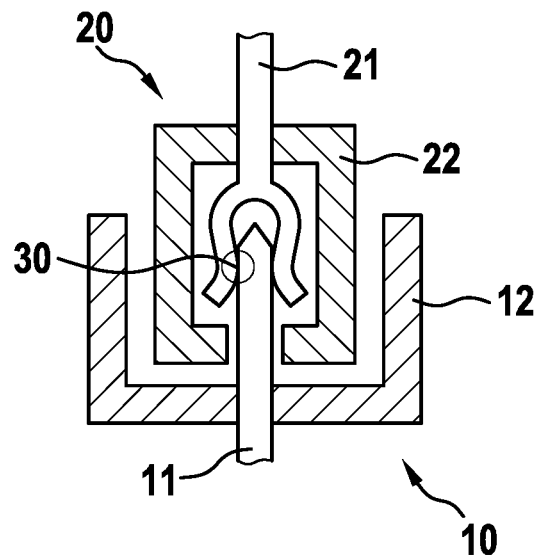
FIG. 1 shows a schematic longitudinal sectional view of an arrangement of two electrical connectors.

FIG. 1 shows the schematic structure of a pair of connectors. A first connector 10 has an electrical contact element 11 in the form of a male element. This is surrounded by a first insulating body 12 made of a plastic. A second connector 20 has a second electrical contact element 21 in the form of a female element. This is surrounded by a second insulating body 22 made of a plastic. When the two connectors 10, 20 are plugged into each other in the manner shown, the second insulating body 22 is pushed into the first insulating body 12, wherein the first electrical contact element 11 slides into the second electrical contact element 21. In doing so, it bends the tongues of the second contact element 21 apart, which are then pressed firmly onto the first contact element 11 by their spring force. Electrical transmission is then possible in a contact region 30 where the two contact elements 11, 21 make contact.

Figure 2:
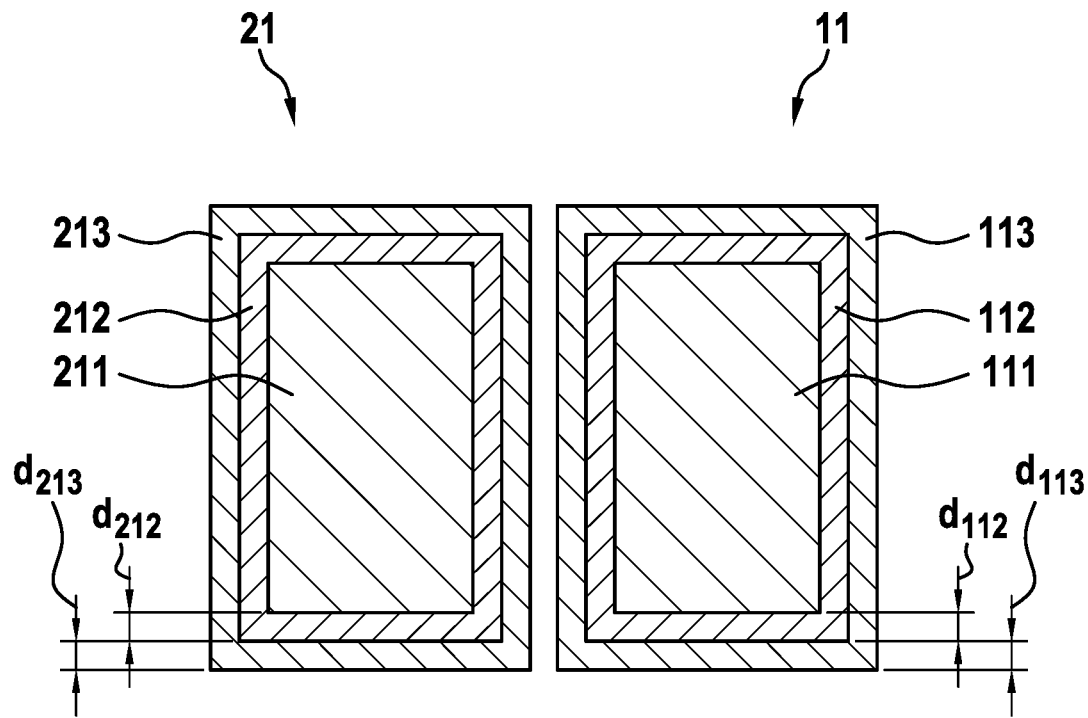
FIG. 2 shows a cross-sectional view of a contact region between two electrical contact elements in a comparative example.

In electrical connectors 10, 20 that have contact elements 11, 21 according to the prior art, the structure of the contact elements 11, 21 depicted in FIG. 2 is present in the contact region 30. The first contact element 11 has a base body 111, an intermediate layer 112 arranged on the base body and a wear layer 113 arranged on the intermediate layer. The second contact element 21 has a base body 211, an intermediate layer 212 arranged on the base body 211, and a wear layer 213 arranged on the intermediate layer 212. The base bodies 111, 211, the intermediate layers 112, 212 and the wear layers 113, 213 each have the composition in percent by weight shown in Table 1:

TABLE 1

|      | Base body 111, 211 | Intermediate layer 112, 212 | Wear layer 113, 213 |
|------|--------------------|-----------------------------|---------------------|
| Au   |                    |                             | 99.8                |
| Co   |                    |                             | 0.2                 |
| Cu   | 100                |                             |                     |
| Ni   |                    | 100                         |                     |
| Ru   |                    |                             |                     |
| PTFE |                    |                             |                     |

In the present example, the intermediate layers 112, 212 each have a thickness $d_{112}$, $d_{212}$ of 3 μm, and the wear layers 113, 213 each have a thickness $d_{113}$, $d_{213}$ of 4 μm. The wear layers 113, 213 contact each other in the contact region 30. The large amount of gold-cobalt alloy, which is necessary for manufacturing the wear layers, results in the manufacture of the electrical contact elements 11, 21 being expensive.

Figure 3:
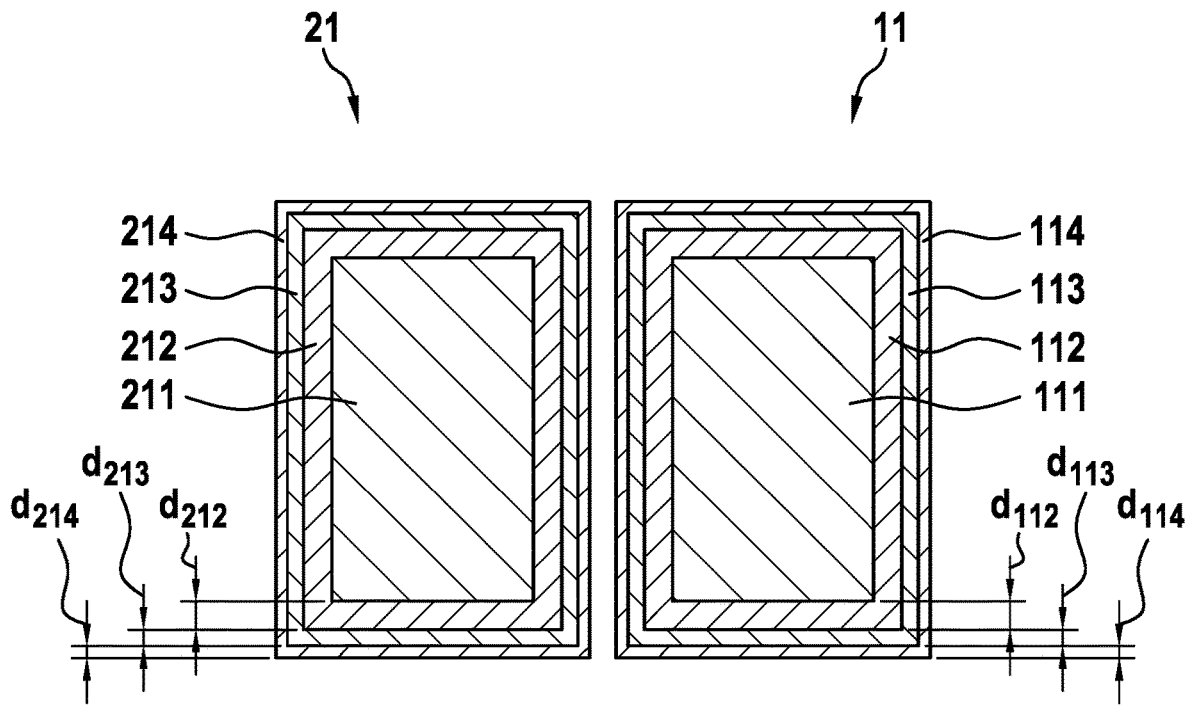
FIG. 3 shows a cross-sectional view of a contact region of two electrical contact elements according to exemplary embodiments of the invention.

FIG. 3 shows the structure of the electrical contact elements 11, 21 according to several exemplary embodiments of the invention, which can be used in the pair of connectors 10, 20 according to FIG. 1. In addition to the structure of the electrical contact elements 11, 21 already depicted in FIG. 2, consisting of base bodies 111, 211, intermediate layers 112, 212 and useful layers 113, 213, the contact elements 11, 21 according to these exemplary embodiments of the invention also have a sliding layer 114, 214 on their wear layers 113, 213. This results in no contacting of the wear layers 113, 213 occurring in the contact region 30, but rather a contacting of the sliding layers 114, 214. While the thickness of the intermediate layers 112, 212 in the exemplary embodiments of the invention corresponds to the thickness of the intermediate layers 112, 212 in the comparative example, the exemplary embodiments according to the invention make do with substantially thinner wear layers 113, 213, the thickness $d_{113}$, $d_{213}$ of which is only 0.65 μm in each case. This results in considerable material savings compared with the comparative example. In the embodiments according to the invention, the sliding layers 114, 214 each have a thickness $d_{114}$, $d_{214}$ of 0.10 μm. Each wear layer 113, 213 is thus thinner even together with its respective sliding layers 114, 214 than the wear layer 113, 213 in the comparative example.

In a first exemplary embodiment of the invention, the components of the contact elements 11, 21 have the composition in percent by weight listed in Table 2.

TABLE 2

|  | Base body 111, 211 | Intermediate layer 112, 212 | Wear layer 113, 213 | Sliding layer 114, 214 |
|---|---|---|---|---|
| Au |  |  |  | 99.8 |
| Co |  |  |  | 0.2 |
| Cu | 100 |  |  |  |
| Ni |  | 100 | 89 |  |
| P |  |  | 11 |  |
| PTFE |  |  |  |  |

The intermediate layer, which consists of pure silver in the comparative example, thus consists of a nickel-phosphorous alloy in the first exemplary embodiment. This results in a cost saving, not only due to less metal used for the wear layer, but also due to the use of a lower-cost alloy.

The sliding layer 114, 214 consists of the same gold-cobalt alloy as the wear layer 113, 213 of the comparative example. Therefore, the sliding properties of the contact elements 11, 21 in the comparative example and in the first exemplary embodiment of the invention are equally good. However, the sliding layer 114, 214 is very thin compared to the wear layer 113, 213 of the comparative example, such that most of the expensive gold-cobalt alloy can be saved.

In a second exemplary embodiment of the electrical contact elements 11, 21, their components have the composition in percent by weight shown in Table 3:

TABLE 3

|  | Base body 111, 211 | Intermediate layer 112, 212 | Wear layer 113, 213 | Sliding layer 114, 214 |
|---|---|---|---|---|
| Au |  |  |  |  |
| Co |  |  |  |  |
| Cu | 100 |  |  |  |
| Ni |  | 100 | 89 |  |
| P |  |  | 11 |  |
| PTFE |  |  |  | 100 |

Compared to the first exemplary embodiment, the metallic sliding layers 114, 214 have been replaced by organic sliding layers, each consisting of PTFE. It was found that by dispensing with an expensive noble metal in the third exemplary embodiment, excellent sliding properties of the contact elements 11, 21 can nevertheless be achieved, wherein the electrical transmission is nevertheless no worse than that of the electrical contact elements 11, 21 in the comparative example.

Figure 4:
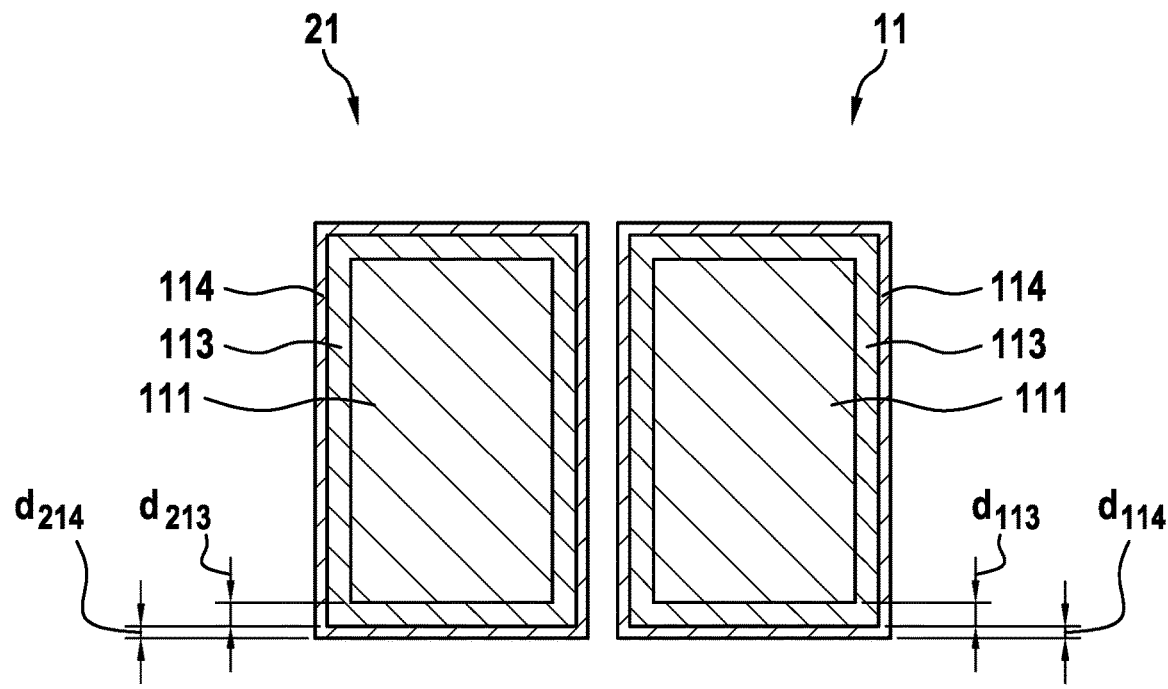
FIG. 4 shows a cross-sectional view of a contact region of two electrical contact elements according to other exemplary embodiments of the invention.

In a third exemplary embodiment of the invention, the intermediate layer 112, 212 is dispensed with, such that the contact elements 11, 21 have the structure depicted in FIG. 4, wherein the wear layer 113, 213 is arranged directly on the base body 111, 211 in each case. In contrast to the previous exemplary embodiments, the thickness $d_{113}, d_{213}$ of the wear layers 113, 213 is 1.50 μm in each case. The components of the contact elements 11, 21 have the composition listed in Table 4 in percent by weight.

TABLE 4

|  | Base body 111, 211 | Wear layer 113, 213 | Sliding layer 114, 214 |
|---|---|---|---|
| Au |  |  | 99.8 |
| Co |  |  | 0.2 |
| Cu | 100 |  |  |
| Ni |  | 89 |  |
| P |  | 11 |  |
| PTFE |  |  |  |

By using a thicker wear layer than in the first and second exemplary embodiments of the invention, the contact elements 11, 21 can thus also be manufactured without using intermediate layers 112, 212. Although thicker wear layers 113, 213 are used here than in the first two exemplary embodiments, these are still significantly thinner than the wear layers 113, 213 of the comparative example.

In a fourth exemplary embodiment of the invention, the sliding layers 114, 214 of the contact elements 11, 21 of the third exemplary embodiment are also replaced by organic sliding layers, each of which consists of PTFE, just as the sliding layers 114, 214 of the first exemplary embodiment were also replaced by PTFE in the second exemplary embodiment. The components of the electrical contact elements 11, 21 then have the composition in percent by weight shown in Table 5:

TABLE 5

|  | Base body 111, 211 | Wear layer 113, 213 | Sliding layer 114, 214 |
|---|---|---|---|
| Au |  |  |  |
| Co |  |  |  |
| Cu | 100 |  |  |
| Ni |  | 89 |  |
| P |  | 11 |  |
| PTFE |  |  | 100 |

All five described exemplary embodiments of the electrical contact elements 11, 21 according to the invention enable a cost-effective replacement of the electrical contact elements 11, 21 according to the comparative example, without this leading to an impairment of the properties relevant for the contact elements 11, 21. They are suitable for electrical operating voltages of more than 150 V.

The invention claimed is:

1. An electrical contact element for a connector, having a metallic base body and a wear layer applied to the base body, wherein the wear layer consists of the following alloy elements:

| 82-91% by weight | nickel |
| 9-18% by weight | phosphorous |
| 0-1% by weight | further alloy elements, | wherein the sum of the alloy elements is 100% by weight, wherein an organic sliding layer is directly coated on the wear layer,
wherein the organic sliding layer contains at least one fatty acid salt, and
wherein the organic sliding layer has a thickness in the range of from 0.05 μm to 0.25 μm.

2. The electrical contact element according to claim 1, wherein the wear layer is arranged directly on the base body.

3. The electrical contact element according to claim 2, wherein the wear layer has a thickness in the range of from 1.00 μm to 2.50 μm.

4. The electrical contact element according to claim 1, wherein a metallic intermediate layer is arranged between the base body and the wear layer.

5. The electrical contact element according to claim 4, wherein the metallic intermediate layer consists of the following alloy elements:

| | |
|---|---|
| 99-100% by weight | copper or nickel |
| 0-1% by weight | further alloy elements, and | wherein the sum of the alloy elements is 100% by weight.

6. The electrical contact element according to claim 4, wherein the metallic intermediate layer has a thickness in the range of from 1.5 μm to 4.0 μm.

7. The electrical contact element according to claim 2, wherein the wear layer has a thickness in the range of from 0.15 μm to 1.50 μm.

8. The electrical contact element according to claim 1, wherein the base body consists of the following alloy elements:

| | |
|---|---|
| 50-100% by weight | copper |
| 0-45% by weight | zinc |
| 0-5% by weight | further alloy elements, and | wherein the sum of the alloy elements is 100% by weight.

9. The electrical contact element according to claim 1, wherein the electrical contact element comprises no gold layer.

\* \* \* \* \*